Feb. 2, 1937. F. M. WHITE 2,069,399
SPRING SUSPENSION FOR AUTOMOBILES
Filed Aug. 12, 1935 3 Sheets-Sheet 1
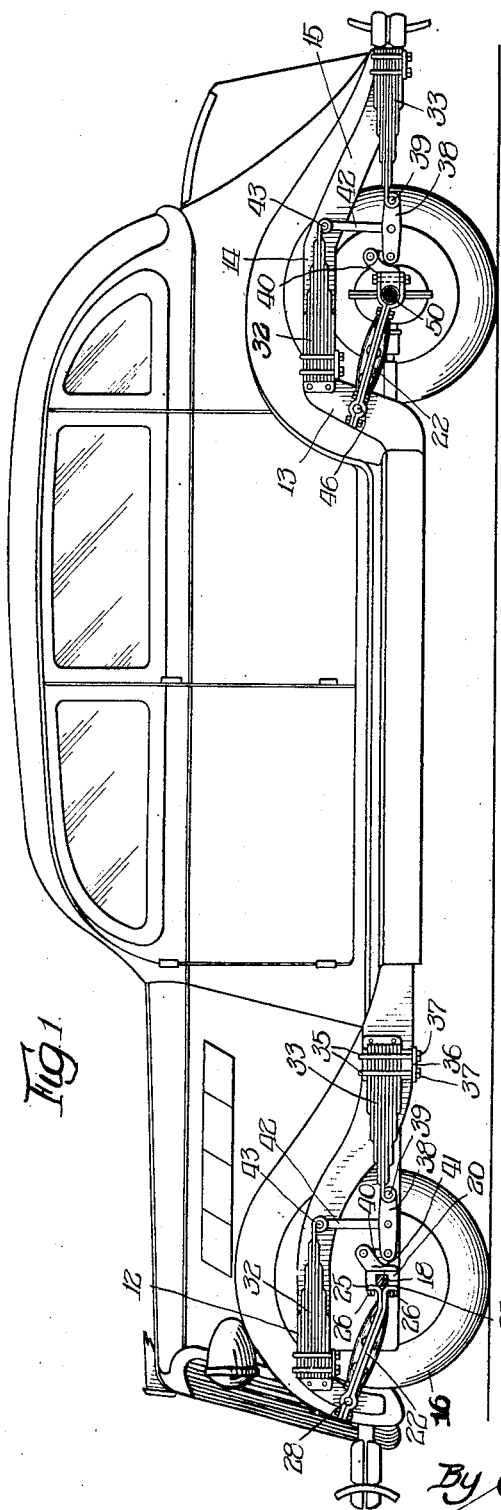
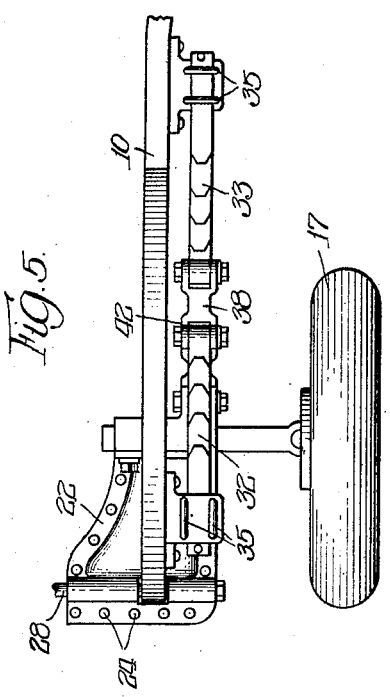
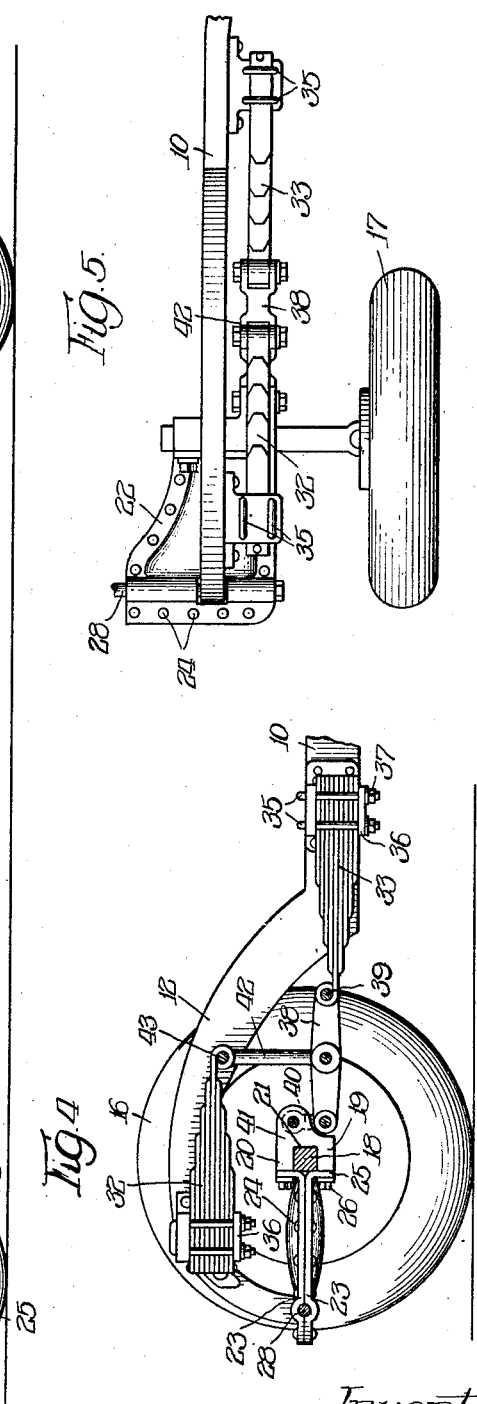
Inventor:
Frank M. White,
By [signature] attys.

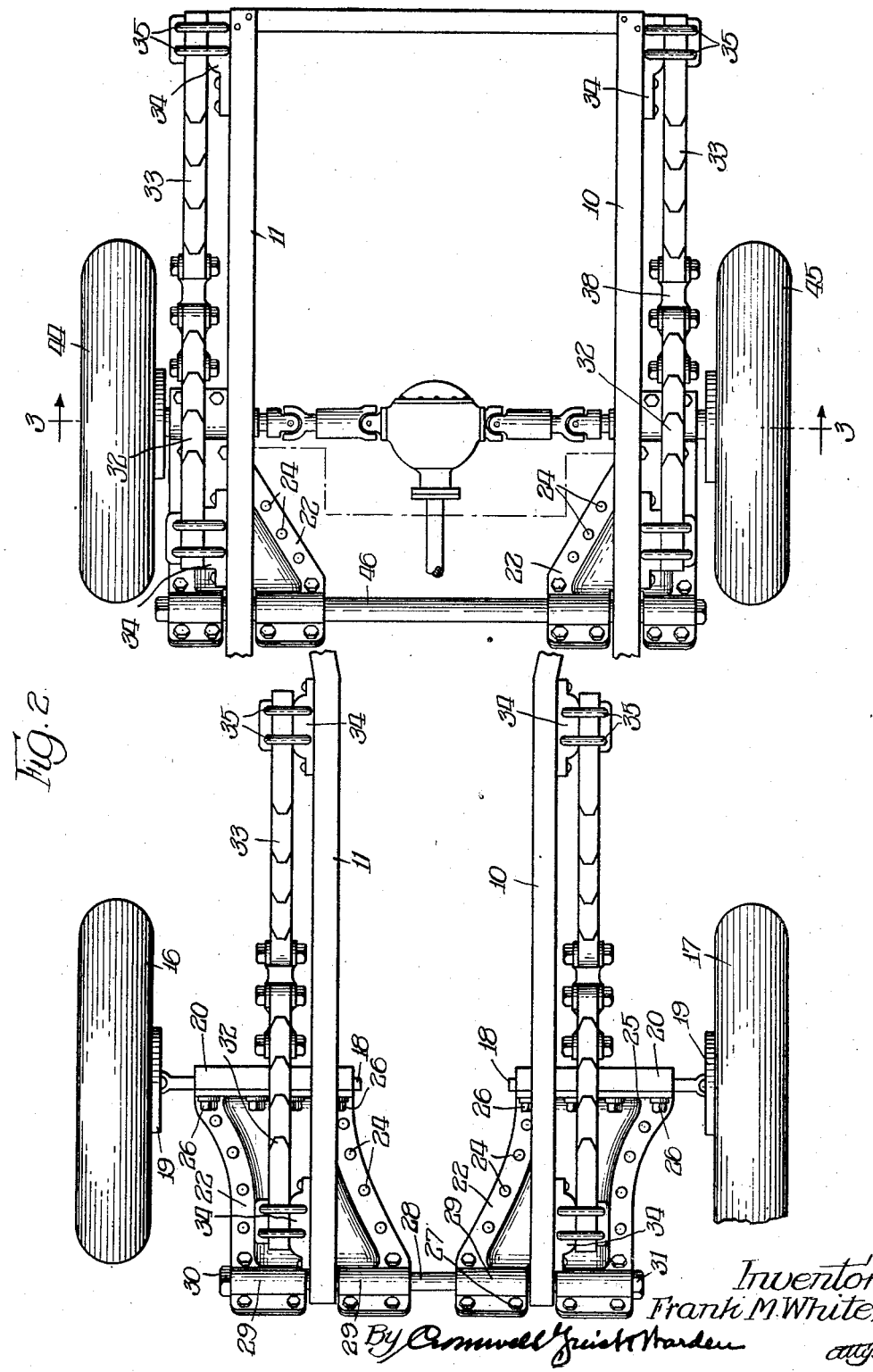

Feb. 2, 1937. F. M. WHITE 2,069,399
SPRING SUSPENSION FOR AUTOMOBILES
Filed Aug. 12, 1935 3 Sheets-Sheet 3
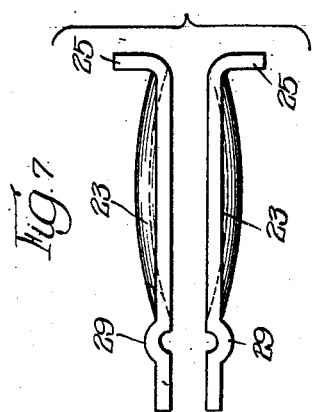
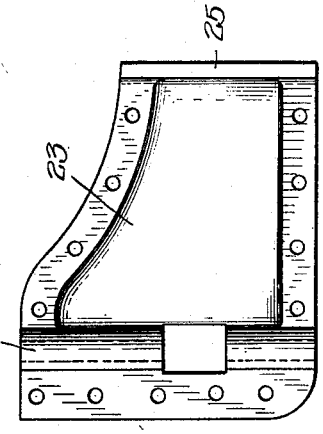
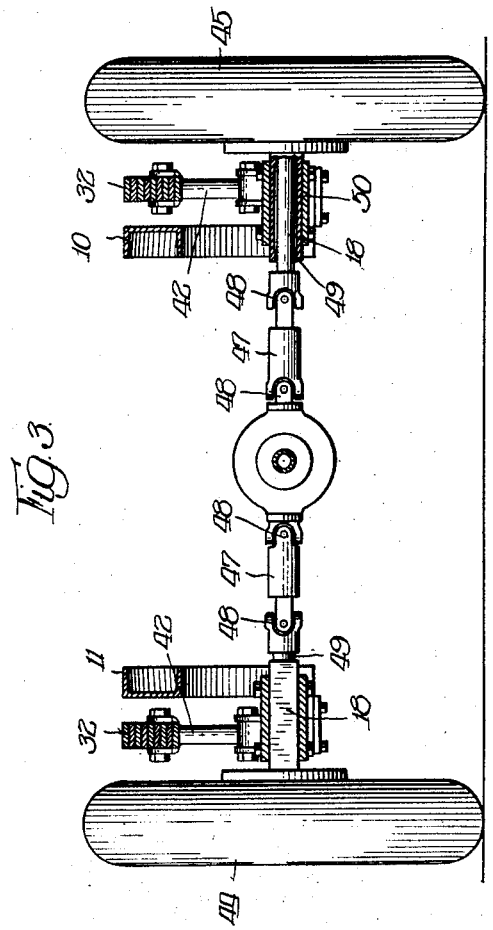
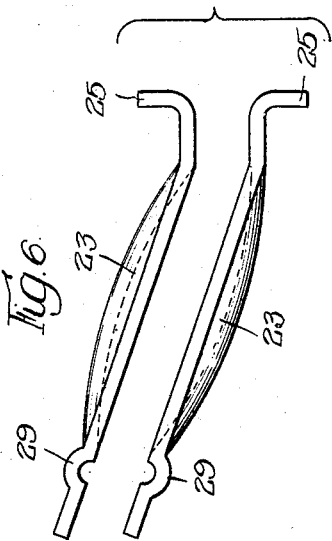
Inventor:
Frank M. White,
By Cromwell Greist Harden
attys Patented Feb. 2, 1937

2,069,399

UNITED STATES PATENT OFFICE 2,069,399

SPRING SUSPENSION FOR AUTOMOBILES

Frank M. White, Forest Park, Ill., assignor of one-third to John K. Shuger and one-third to Elmer E. Colby, both of Chicago, Ill.

Application August 12, 1935, Serial No. 35,694

REISSUED

10 Claims. (Cl. 267—19)

The present invention is related to spring suspension for automobiles.

The main and primary object of the invention is to provide a spring suspension which is applicable to individual wheels, whereby each wheel is capable of free movement independently of the others in order to absorb shock without imparting the latter to the other wheels or transmitting the same to the chassis or body of the vehicle.

A further object of the invention is the provision of a spring suspension of the character mentioned designed to support the body of the vehicle throughout its length without change of equilibrium, whether under load or not, and by which the riding qualities of the vehicle are unaffected by the position of the seats or the load.

The invention also aims to provide a spring suspension in which the jolts and vibrations set up by inequalities of the roadbed are dissipated before reaching the chassis or body, thus preventing disturbance of the even balance thereof, as well as preventing catapulting of the body as inequalities in the road surface are reached.

Furthermore, the invention also contemplates a spring suspension the parts of which are so organized and related as to eliminate warping of the springs and to maintain the wheel in a vertical plane, thereby to insure even wear on the parts.

A still further object of the invention is the provision of a spring suspension for automobiles by which listing of the vehicle body in making sharp turns is prevented.

A still further object of the invention is to so construct and adapt a spring suspension to a motor vehicle that the frame or chassis thereof to which the suspension is applied, as well as the body of the vehicle, will be free from being warped or twisted and thrown out of normal aligned position of its parts. Due to this characteristic of the present invention the heavy reinforcing bracings, such as the so-called X-frames and the like now used, may be eliminated, thereby economizing in the cost of the chassis.

Other objects and advantages will appear as the nature of the improvements is better understood, the invention consisting substantially in the novel construction, combination and arrangement of parts hereinafter fully described, illustrated in the accompanying drawings, and finally pointed out in the appended claims.

While the form of the invention herein shown and described presents a practical embodiment thereof, it will be understood that the same is susceptible to change, modification and variation, so that the present disclosure is to be considered from the illustrative standpoint and not as imposing restriction or limitation upon the invention.

In the drawings,

Fig. 1 is a longitudinal sectional view of a conventional automobile into which the spring suspension of the present invention has been incorporated;

Fig. 2 is a top plan view thereof;

Fig. 3 is a transverse sectional view, as on the line 3—3, Fig. 2;

Fig. 4 is a sectional elevation illustrating a slightly modified form of the invention;

Fig. 5 is a top plan view of the construction illustrated in Fig. 4;

Fig. 6 is a detail elevation of the axle-clamping bracket employed with the embodiment of the invention appearing in Figs. 1 and 2, the parts thereof being separated;

Fig. 7 is a similar view of the axle-clamping bracket employed with the embodiment of the invention appearing in Figs. 4 and 5; and Fig. 8 is a top plan view of the axle-clamping bracket shown in Fig. 7.

Referring now in detail to the drawings, the numerals 10 and 11 designate the side frame members of the chassis of a motor vehicle. The forward end of each of these side frame members is provided with an upwardly-bowed portion 12, while the rear end has an upwardly inclined arm 13 from which projects a horizontal extension 14 that terminates in a downwardly-inclined arm 15. Thus, each end of each of the side frame members is fashioned so as to provide clearance for the axles of the wheels, and thereby to permit free up and down movement of the axles as the wheels ride over inequalities in the roadbed.

As before stated, the present spring suspension is applicable to the individual wheels, so that each wheel is capable of free movement independently of the others. In that movement each wheel will absorb the shock occasioned by its contact with an inequality in the roadbed without imparting the shock to the other wheels, or transmitting the same to the chassis or body of the vehicle. The spring suspension associated with each wheel is the same as employed with the other wheels so that in the following description it will be understood that the spring suspension set forth therein applies to all of the wheels.

Having reference particularly to the front or steering wheels of the vehicle, designated by the numerals 16 and 17, each of these wheels is carried by a short axle 18, a steering knuckle 19 being associated with each wheel to permit turning of the wheels for steering the vehicle. The construction of this steering knuckle is conventional and forms no part of the present invention.

The axle 18 is received by a housing 20 which is recessed and shaped to conform to the cross-sectional contour of the axle 18, the recess being designated by the numeral 21, and said housing is connected to and carried by a clamping bracket 22 by which the axle 18 is held within the housing 20. This clamping bracket 22 is formed of two complemental, relatively broad plates 23 the body portions of which are bowed outwardly or arched in order to strengthen the same, said plates being reversely arranged with respect to each other, and being held together by a plurality of rivets or bolts 24 located at the edges of the plates. The rear ends of the plates 23 are provided with aligned transverse flanges 25, which flanges contact the face of the axle-receiving housing 20 at the face thereof in which the recess 21 is formed, the flanges 25 thus serving to close the open face of the housing and hold the axle 18 therein. The housing 20 is held to the attaching flanges 25 by means of a plurality of bolts 26 that pass through the flanges and engage the housing, and by this attachment of the housing 20 to the bracket 22 the housing 20 is mounted for movement with the bracket 22.

At the forward end of the clamping bracket 22 the same is provided with a notch or recess 27, which notch or recess receives the forward end of the side frame member 10 or 11 with which the clamping bracket 22 is associated. A hinge rod 28 is received by the forward ends of the side frame members 10 and 11, said rod passing through suitable openings in the frame members and being of sufficient length so that its ends will project beyond the frame member. Each of the plates 23 of the clamping bracket 22 has a bearing sleeve 29 formed transversely of its forward end, the sleeves 29 of the two plates 23 being fitted about and receiving one end of the hinge rod 28, and by reason of this construction it will be understood that the clamping bracket 22 is hingedly connected to the rod 28 and will swing up and down thereon in accordance with the movement of the steering wheel associated with the bracket as that wheel passes over inequalities in the roadbed.

Due to the fact that the forward ends of the side frame members are received by the notches 27 of the clamping brackets 22 there will be no movement of the clamping brackets lengthwise of the hinge rod, but in order to retain the brackets on the rod the latter has a head 30 at one end and a nut 31 screw threaded to the other end, the rod 28, the brackets 22, and the forward ends of the side frame members 10 and 11 thus being held together but permitting the free movement of the clamping brackets 22 as described.

For cushioning the movement of the wheel with which the present spring suspension is associated, and for absorbing the shock incident to contact of the wheel with inequalities of the roadbed, a pair of springs 32 and 33 is employed. The spring 32 is arranged at a point above the axle 18 and in advance of the same, and conveniently may be termed the upper spring. The spring 33 is arranged on a lower plane than the spring 32 and is positioned in rear or at one side of the axle 18 and spaced therefrom, but in substantially the same line. The spring 33 conveniently may be termed the lower spring.

By positioning the springs 32 and 33 in the manner described they are vertically offset with respect to each other. This affords a close-coupled compact arrangement of the parts and insures strength and positiveness of action in the functioning of the suspension.

Each of the springs 32 and 33 is made up of a plurality of leaves, the longest of these leaves being disposed at the center of each spring, with an equal number of leaves at either side of the longest leaf. These springs are reversely-arranged with respect to each other, and this positions the free or inner ends of the longest leaves in relatively close proximity. The butts or outer ends of the springs 32 and 33 are seated against elongated anchoring blocks 34 which are securely fastened, as by any suitable means, to the adjacent side frame member 10 or 11, as the case may be. Associated with each of the anchoring blocks 34 is a pair of U-shaped fastening clips 35, the butts of the springs 32 and 33 being received by said clips and being held therein by clamping plates 36 mounted at the lower ends of the clips 35 and securely held thereon by nuts 37. In this manner the butts of the springs 32 and 33 are held rigidly in position on the side frame members, but the free ends of the springs are capable of ready yielding.

It is the purpose of the present invention to utilize the action of the springs 32 and 33 for equalizing the distribution of the shock and the stresses imposed upon the wheel as the latter encounters inequalities in the roadbed, and to this end an equalizing link 38 is interposed between the free ends of the springs 32 and 33. One end of said link 38 is hingedly connected, as at 39, to the free end of the longest leaf of the spring 33, the other end of the equalizing link 38 being connected to a suspensory link 40 which has a hinged connection with an attaching lug 41 carried by the axle housing 20. At a point midway the ends of the equalizing link 38 is hingedly connected the lower end of a supporting link 42, the upper end of said link 42 being hingedly connected, as at 43, to the free end of the longest leaf of the upper spring 32. Thus the axle 18 is yieldingly supported by the springs 32 and 33.

So long as the surface of the roadbed is smooth the parts remain in the relative positions in which they appear in the drawings. If, however, the wheel encounters any inequalities in the roadbed over which the wheel is compelled to pass, or into which the wheel may dip, it will be apparent that the axle 18 may rise or fall, and during this movement of the axle the links 38, 40 and 42 will swing at their respective hinge connections so as to take up the movement of the wheel imposed by the inequalities of the roadbed, which swinging movements of the links will be communicated to the springs 32 and 33 and cause the latter to flex to the required extent for absorbing the shock due to the distorted movements of the wheel, and dissipate this shock to such an extent as to preclude the same passing to the chassis or body of the vehicle.

Manifestly, since each wheel has its independent spring suspension, and therefore, is not susceptible to the movements of the other wheels, there is no transmission of shock or jar from one wheel to another, nor is any one wheel affected by the shock or jar that may be imposed upon any of the other wheels.

It has been pointed out that the spring suspension is the same for each wheel, and the description heretofore given with reference to the steering wheels 16 and 17 applies with equal force to the driving wheels 44 and 45. The clamping brackets 22, however, of the spring suspensions of the driving wheels are connected to a hinge bar 46 which passes transversely of the side frame members 10 and 11, and is positioned in the upwardly inclined arms 13 of said side frame members. The hinge bar 46 is of the same construction as the hinge bar 28, and the spring suspensions of the driving wheels function in precisely the same manner as the spring suspensions of the steering wheels.

In adapting the present invention to the driving axle of a motor vehicle it is necessary that articulated sections 47 be incorporated in the driving axle between the differential and the axles 18 of the wheels 44 and 45 in order to permit independent movement of these wheels, and also to provide for the rise and fall of the same without disturbing the driving connection with the differential. The construction referred to is illustrated in Fig. 3, the articulated sections 47 including universal joints 48 which afford the relative movements between the driving wheels and the differential to which reference has been made.

The shafts 18, in the case of the rear axle construction, are received by housings 49 wherein roller bearings 50 are located which surround the axles 18.

As is apparent from Figs. 1 and 6, the plates 23 of the clamping brackets 22 have their bodies slightly inclined, which permits the axles 18 to occupy positions relatively nearer to the ground. In the construction illustrated in Figs. 4 and 7 the plates 23 of the clamping brackets 22 are devoid of such inclination and are in the same plane throughout their length. This permits the axles 18 to be positioned in a relatively higher plane than in the construction illustrated in Figs. 1 and 6.

It will be understood that the knuckles 19 may be caused to operate in unison by the usual conventional steering mechanism found in the present-day motor vehicle. This mechanism is not shown as it forms no part of the present invention and it is omitted for purposes of clearness of disclosure of the structural features of the invention.

By the employment of the present invention the jolts and road vibrations are dissipated between the springs 32 and 33, both of which operate instantly in opposite directions, and each takes one-half of the force exerted by the wheel, thus preventing disturbance of the even balance of the chassis and body. These springs support the body throughout its full length without change of equilibrium, whether with or without load, and the position of the seats and that of the load does not affect the riding quality of the vehicle. Moreover, due to the present invention, the body of the vehicle is prevented catapulting. The construction is such, particularly with reference to the relatively broad clamping brackets 22 and their clamping relation with respect to the axles, as to prevent warping of the springs and maintain the wheels in vertical planes, thereby assuring even wear on the parts. The use of the invention also eliminates the employment of shock absorbers, and solid tires with flexible treads may be substituted for the universally-employed pneumatic tires, with their attendant disadvantages. By the use of the invention body listing, in making sharp turns, is also prevented.

I claim:

1. In a spring suspension of the class described, the combination with a wheel and an axle to which the wheel is connected, of a support for said axle hingedly connected to the frame of the vehicle and permitting said axle and its wheel to move relatively to said frame, a pair of resilient devices arranged in different horizontal planes on the vehicle frame but vertically offset with respect to each other for absorbing the movement of the wheel relatively to the vehicle frame, and an equalizing device connected to said resilient devices and to said axle for transmitting movement of the axle to said resilient devices to permit the latter to absorb and dissipate the shock of the wheel movement.

2. In a spring suspension of the class described, the combination with a wheel and an axle, of a support for said axle hingedly connected to the frame of the vehicle and permitting said axle and its wheel to move relatively to said frame, a pair of resilient devices arranged in different horizontal planes on the vehicle frame but vertically offset with respect to each other for absorbing the movement of the wheel relatively to the vehicle frame, an equalizing device connected to the lower of said resilient devices and also to said axle, and a connection between said equalizing device and the upper of said resilient devices, whereby movement of the axle is transmitted to said resilient devices to permit the latter to absorb and dissipate the shock of the wheel movement.

3. In a spring suspension of the class described, the combination with a wheel and an axle to which the wheel is connected, of a support for said axle hingedly connected to the frame of the vehicle and permitting said axle and its wheel to move relatively to said frame, a pair of oppositely-disposed resilient devices arranged in different horizontal planes on the vehicle frame for absorbing the movement of the wheel relatively to the vehicle frame, one of said devices being arranged above and over the axle and the other being arranged at one side of the axle and spaced therefrom, the adjacent ends of said resilient devices being free, an equalizing device connected to the free end of one of said resilient devices and also to said axle, and a connection between said equalizing device and the free end of the other of said resilient devices, whereby movement of the axle is transmitted to said resilient devices to permit the latter to absorb and dissipate the shock of the wheel movement.

4. In a spring suspension of the class described, the combination with a wheel and an axle to which the wheel is connected, of a support for said axle hingedly connected to the frame of the vehicle and permitting said axle and its wheel to move relatively to said frame, a pair of oppositely-disposed resilient devices arranged in different horizontal planes on the vehicle frame for absorbing the movement of the wheel relatively to the vehicle frame, one of said devices being arranged above and over the axle and the other being arranged at one side of the axle and spaced therefrom, the adjacent ends of said resilient devices being free, an equalizing device connected to the free end of the lower of said resilient devices and also to said axle, and a supporting link hingedly connected to the equalizing device intermediate its ends and also to the free end of the upper of said resilient devices, whereby movement of the axle is transmitted to said resilient devices to permit the latter to absorb and dissipate the shock of the wheel movement.

5. In a spring suspension of the class described, the combination with a side frame member of a chassis, of a support hingedly connected to said member and movable vertically thereon, a wheel connected to said hinged support for vertical movement with the latter, a pair of oppositely-disposed springs carried by the side frame member and arranged in different horizontal planes but vertically offset with respect to each other for absorbing the movement of the wheel as it moves with said hinged support, an equalizing device hingedly connected to the lower spring and to the support for the wheel, and a connection between said equalizing device and the upper spring, whereby movement of the wheel is transmitted to said springs to permit the latter to absorb and dissipate the shock of the wheel movement.

6. In a spring suspension of the class described, the combination with a side frame member of a chassis, of a support hingedly connected to said member and movable vertically thereon, a wheel connected to said hinged support for vertical movement with the latter, a pair of oppositely-disposed springs associated with the side frame member and arranged in different horizontal planes but vertically offset with respect to each other the inner ends of said springs being free and the outer ends being rigidly connected to the side frame member, said springs serving to absorb the movement of the wheel as it moves with said hinged support, an equalizing device hingedly connected to the inner free end of the lower spring and also to the support for the wheel, and a connection between said equalizing device and the inner free end of the upper spring, whereby movement of the wheel is transmitted to said springs to permit the latter to absorb and dissipate the shock of the wheel movement.

7. In a spring suspension of the class described, the combination with a side frame member of a chassis, of a support hingedly connected to said member and movable vertically thereon, a wheel connected to said hinged support for vertical movement with the latter, a pair of reversely-disposed springs associated with the side frame member and arranged in different horizontal planes but vertically offset with respect to each other, the inner ends of said springs being free and their outer ends being rigidly connected to the side frame member, said springs serving to absorb the movement of the wheel as it moves with said hinged support, an equalizing link having one of its ends hingedly connected to the inner free end of the lower spring and its opposite end hingedly connected to the wheel support, and a supporting link hingedly connected to the equalizing link intermediate its ends, the upper end of the supporting link being hingedly connected to the inner free end of the upper spring, whereby movement of the wheel is transmitted to said springs to permit the latter to absorb and dissipate the shock of the wheel movement.

8. In a spring suspension of the class described, the combination with a side frame member of a chassis, of a support hingedly connected at one of its ends to said member and movable vertically thereon, an axle housing carried by the other end of said support, an axle arranged in said housing, a wheel carried by said axle and movable vertically with said hinged support, a pair of oppositely-disposed springs associated with the side frame member and arranged in different horizontal planes but vertically offset with respect to each other, the inner ends of said springs being free and their outer ends being rigidly connected to the side frame member, said springs serving to absorb the movement of the wheel as it moves with said hinged support, an equalizing device hingedly connected to the inner free end of the lower spring and also to the support for the wheel, and a connection between said equalizing device and the inner free end of the upper spring, whereby movement of the wheel is transmitted to said springs to permit the latter to absorb and dissipate the shock of the wheel movement.

9. In a spring suspension of the class described, the combination with a side frame member of a chassis, of a support hingedly connected to said member and movable vertically thereon, a wheel connected to said hinged support for vertical movement with the latter, a pair of oppositely-disposed springs carried by the side frame member and arranged in different horizontal planes for absorbing the movement of the wheel as it moves with said hinged support, each of said springs comprising a plurality of leaves including a relatively long leaf disposed at the center and with an equal number of leaves disposed at each side of the center leaf and shorter than the latter, whereby one end of the center leaf projects beyond the side leaves, an equalizing device hingedly connected to the projecting end of the center leaf of the lower spring and to the support for the wheel, and a connection between said equalizing device and the projecting end of the center leaf of the upper spring, whereby movement of the wheel is transmitted to said springs to permit the latter to absorb and dissipate the shock of the wheel movement.

10. In a spring suspension of the class described, the combination with a side frame member of a chassis, of a support hingedly connected to said member and movable vertically thereon, a wheel connected to said hinged support for vertical movement with the latter, a pair of oppositely-disposed springs carried by the side frame member and arranged in different horizontal planes but vertically offset with respect to each other for absorbing the movement of the wheel as it moves with said hinged support, each of said springs comprising a plurality of leaves including a relatively long leaf disposed at the center and with an equal number of leaves disposed at each side of the center leaf and shorter than the latter, whereby one end of the center leaf projects beyond the side leaves, an equalizing device hingedly connected to the projecting end of the center leaf of the lower spring and to the support for the wheel, and a connection between said equalizing device and the projecting end of the center leaf of the upper spring, whereby movement of the wheel is transmitted to said springs to permit the latter to absorb and dissipate the shock of the wheel movement.

FRANK M. WHITE.